United States Patent
Ishida

(10) Patent No.: US 12,473,208 B2
(45) Date of Patent: Nov. 18, 2025

(54) PRODUCTION METHOD AND PRODUCTION APPARATUS FOR NICKEL SULFATE SOLUTION

(71) Applicant: SUMITOMO METAL MINING CO., LTD., Tokyo (JP)

(72) Inventor: Hitoshi Ishida, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 837 days.

(21) Appl. No.: 17/413,748

(22) PCT Filed: Oct. 23, 2019

(86) PCT No.: PCT/JP2019/041545
§ 371 (c)(1),
(2) Date: Jun. 14, 2021

(87) PCT Pub. No.: WO2020/129396
PCT Pub. Date: Jun. 25, 2020

(65) Prior Publication Data
US 2022/0055916 A1    Feb. 24, 2022

(30) Foreign Application Priority Data
Dec. 20, 2018  (JP) ................. 2018-237864

(51) Int. Cl.
C01G 53/10     (2006.01)
C22B 3/00      (2006.01)
C22B 3/08      (2006.01)

(52) U.S. Cl.
CPC ............... C01G 53/10 (2013.01); C22B 3/08 (2013.01); C22B 23/043 (2013.01)

(58) Field of Classification Search
CPC .......... C01G 53/10; C22B 3/08; C22B 23/043
See application file for complete search history.

(56) References Cited

U.S. PATENT DOCUMENTS

| 4,548,794 A | 10/1985 | Lowenhaupt et al. |
| 2005/0123469 A1* | 6/2005 | Fierro .................... C01G 53/04 423/544 |

(Continued)

FOREIGN PATENT DOCUMENTS

| JP | S60-75536 A | 4/1985 |
| JP | 2004067483 A * | 3/2004 |

(Continued)

OTHER PUBLICATIONS

English translation of JP-5929664-B2 Description (Year: 2016).*
(Continued)

*Primary Examiner* — Anthony J Zimmer
*Assistant Examiner* — Zachary John Baum
(74) *Attorney, Agent, or Firm* — Kratz, Quintos & Hanson, LLP

(57) ABSTRACT

Provided is a production method and a production apparatus that increase a throughput of nickel sulfate per equipment. A first dissolution step I of introducing a nickel briquette, sulfuric acid, and water to a leaching tank (1) and dissolving the nickel briquette to obtain a primary nickel sulfate solution, and a second dissolution step II of introducing the primary nickel sulfate solution and additionally introducing a nickel briquette to a leaching adjustment tank (2) and dissolving the additionally introduced nickel briquette with free sulfuric acid in the primary nickel sulfate solution to obtain a nickel sulfate solution are executed in this order. With the leaching adjustment tank (2) having a role as a concentration adjustment tank that increases a nickel concentration and decreases a free sulfuric acid concentration, and the leaching tank (1) supplied with the sulfuric acid and the water in addition to the nickel briquette, a continuous dissolution is achievable without increasing a retention time and without unnecessarily enlarging the equipment.

5 Claims, 5 Drawing Sheets

(56) References Cited

U.S. PATENT DOCUMENTS

2009/0049954 A1* 2/2009 Shore .................. C22B 11/048
                                                            75/744
2015/0329375 A1    11/2015 Heguri et al.

FOREIGN PATENT DOCUMENTS

JP          2014-144877 A      8/2014
JP            5929664 B2 *     6/2016

OTHER PUBLICATIONS

English translation of JP-2004067483-A Description (Year: 2004).*
International Search Report for International Application No. PCT/JP2019/041545 dated Dec. 10, 2019 (1 sheet, 1 sheet translation, 2 sheets total).

* cited by examiner

PRODUCTION METHOD AND PRODUCTION APPARATUS FOR NICKEL SULFATE SOLUTION

TECHNICAL FIELD

The present invention relates to a production method and a production apparatus for a nickel sulfate solution.

BACKGROUND ART

Recently, along with the spread of mobile electronic devices, such as a mobile phone and a laptop personal computer, it is desired to develop a compact and lightweight secondary battery having a high energy density. It is also desired to develop a secondary battery having a high output power as a battery for an electric vehicle including a hybrid vehicle. As a non-aqueous electrolyte secondary battery that satisfies these desires, a lithium ion secondary battery is included.

The lithium ion secondary battery includes a negative electrode, a positive electrode, an electrolyte, and the like, and a material from/into which lithium can be de-insert/inserted is used for active materials of the negative electrode and the positive electrode.

Since a lithium ion secondary battery that uses a lithium composite oxide, especially a lithium cobalt composite oxide, which is relatively easily synthesized, for the positive electrode material provides a high voltage of 4 V class, it is expected as a battery having a high energy density while its practical application is promoted. For the battery using the lithium cobalt composite oxide, many developments for obtaining excellent initial capacitance characteristics and cycle characteristics have been conducted, and various successful results have been already obtained.

However, since the lithium cobalt composite oxide uses an expensive cobalt compound as a raw material, a unit price per capacity of the battery using the lithium cobalt composite oxide is significantly increased compared with a nickel metal hydride battery, and its applicable usage is considerably limited.

Therefore, for the compact secondary battery for the portable device and the large-sized secondary battery for electric power storage and for electric vehicle, it is highly expected to reduce the cost of the positive electrode material to allow manufacturing a lower-priced lithium ion secondary battery, and its achievement can have industrially great significance.

Examples of a new material of the active material for the lithium ion secondary battery can include, a lithium nickel composite oxide using nickel, which is low-priced compared with cobalt. Since the lithium nickel composite oxide has an electrochemical potential lower than that of the lithium cobalt composite oxide, decomposition due to oxidation of the electrolyte is less likely to cause a problem, a higher capacity is expectable, and a high battery voltage is provided similarly to the cobalt-based one. Therefore, its development is actively conducted.

In a process of producing the lithium nickel composite oxide, nickel sulfate is mainly used as a nickel raw material. The nickel sulfate is generally formed as a nickel sulfate solution by dissolving nickel as the raw material with sulfuric acid. Therefore, how to prepare a large amount of the nickel sulfate solution at low cost has become a major problem to be solved in production of the lithium nickel composite oxide.

Patent Document 1 discloses a method for producing nickel sulfate by dissolving a nickel briquette. While this is a method in which a briquette made by sintering a nickel powder is dissolved with sulfuric acid to obtain a nickel sulfate solution, when this is applied to an actual plant, batch processing necessitates repeating a cycle of introducing raw material, dissolution, draining, and the like. There has been a problem of a small throughput per equipment because there is a time period in which the dissolution is not performed while the process is simple.

Especially, a dissolution rate of nickel is a problem. As described in Patent Document 1, the nickel dissolution rate is low in an environment in which a concentration of free sulfuric acid is low, the undissolved nickel briquettes are only accumulated in a simple continuous dissolution tank, and the nickel solution of the high concentration cannot be obtained. When the tank is enlarged to lengthen the retention time, while the concentration reaches a certain extent, a large space and large equipment are required for obtaining the throughput and an initial investment increases, thus eliminating the merit of its continuity.

Furthermore, since the temperature is raised for dissolution, the environments of high temperature and room temperature are repeated in the dissolution tank for each batch, and therefore, a thermal shock and equipment deterioration caused thereby need to be considered. Specifically, an increase of inspection frequency, replacement of equipment in preventive maintenance, or the like are not preferable processes also in the running cost.

CITATION LIST

Patent Literature

Patent Document 1: JP-A-2004-67483

SUMMARY OF INVENTION

Technical Problem

Therefore, in consideration of the above-described circumstances, the present invention has an object to provide a production method and a production apparatus for a nickel sulfate solution that can increase a throughput of nickel sulfate per equipment and prolong a life of equipment.

Solution to Problem

A production method for a nickel sulfate solution of the first invention is a production method for a nickel sulfate solution that includes: a first dissolution step of introducing a nickel briquette, sulfuric acid, and water to a leaching tank and dissolving the nickel briquette to obtain a primary nickel sulfate solution; and a second dissolution step of introducing the primary nickel sulfate solution and additionally introducing a nickel briquette to a leaching adjustment tank and dissolving the additionally introduced nickel briquette with free sulfuric acid in the primary nickel sulfate solution to obtain a nickel sulfate solution.

In the production method for the nickel sulfate solution of the second invention, in the first invention, a concentration of the free sulfuric acid in the primary nickel sulfate solution in the leaching tank is set to 60 to 80 g/L.

In the production method for the nickel sulfate solution of the third invention, in the first invention or the second invention, a nickel concentration of the primary nickel sulfate solution in the leaching tank is set to 40 to 110 g/L.

In the production method for the nickel sulfate solution of the fourth invention, in any of the first invention to the third invention, a pH value (converted under 25° C.) of the nickel sulfate solution in the leaching adjustment tank is set to 0.5 to 3.

In the production method for the nickel sulfate solution of the fifth invention, in the first, second, third, or fourth invention, a supply rate of the nickel briquette in the first dissolution step is set to 37 to 47 $kg/h/m^3$, and a supply rate of the nickel briquette in the second dissolution step is set to 18 to 28 $kg/h/m^3$.

The production method for the nickel sulfate solution of the sixth invention, in the first, second, third, fourth, or fifth invention, includes: measuring a nickel concentration and a pH of the nickel sulfate solution in the second dissolution step; and controlling supply amounts of the sulfuric acid and the water in the first dissolution step based on the nickel concentration and the pH.

A production apparatus for a nickel sulfate solution of the seventh invention includes: a leaching tank in which a nickel briquette, sulfuric acid, and water are introduced and the nickel briquette is dissolved to obtain a primary nickel sulfate solution; and a leaching adjustment tank in which the primary nickel sulfate solution and an additional nickel briquette are introduced and the nickel briquette is dissolved with free sulfuric acid in the primary nickel sulfate solution to obtain a nickel sulfate solution.

The production apparatus for the nickel sulfate solution of the eighth invention, in the seventh invention, includes; measurement means that measures a nickel concentration and a pH of the nickel sulfate solution in the leaching adjustment tank; and control means that controls supply amounts of the sulfuric acid and the water supplied to the leaching tank based on the nickel concentration and the pH of the nickel sulfate solution in the leaching adjustment tank.

Advantageous Effects of Invention

According to the first invention, a free sulfuric acid concentration is increased to dissolve a large amount of nickel briquette in the leaching tank (first tank), and a small amount of nickel briquette is dissolved with only the free sulfuric acid, which was an excess in the leaching tank, in the leaching adjustment tank (second tank), thereby allowing obtaining the nickel solution of a target concentration. That is, with the leaching adjustment tank having a role as a concentration adjustment tank that increases the nickel concentration and decreases the free sulfuric acid concentration, and with the leaching tank supplied with the sulfuric acid and the water, a continuous dissolution can be achieved without increasing a retention time and without unnecessarily enlarging the equipment. Accordingly, a throughput per equipment can be increased, and a thermal shock in a case of batch processing can be reduced to extend the product lifetime of the equipment.

According to the second invention, a large amount of nickel can be dissolved in a short period, the amount of the free sulfuric acid in the leaching tank 1 increases, and the dissolution of the nickel briquette can be promoted.

According to the third invention, the nickel solution of the target concentration is obtained, and a pipe obstruction caused by recrystallization of a part of the nickel sulfate in a later process is avoided.

According to the fourth invention, the free sulfuric acid concentration and the nickel briquette retention amount in the tank are made proper.

According to the fifth invention, with this supply ratio, in the leaching tank having the large dissolution rate and the leaching adjustment tank having the small dissolution rate, the nickel briquette retention amounts in the respective tanks can be made equal.

According to the sixth invention, since the first dissolution step is controlled based on the result of the second dissolution step, the nickel solution of the predetermined concentration can be stably obtained, and a reasonable raw material can be obtained in a process of producing a lithium nickel composite oxide in the later process.

According to the seventh invention, an operation can be performed such that a free sulfuric acid concentration is increased to dissolve a large amount of nickel briquette in the leaching tank (first tank), and a small amount of nickel briquette is dissolved with only the free sulfuric acid, which was an excess in the leaching tank, in the leaching adjustment tank (second tank), thereby allowing obtaining the nickel solution of a target concentration. Therefore, with the leaching adjustment tank having a role as a concentration adjustment tank that increases the nickel concentration and decreases the free sulfuric acid concentration, and with the leaching tank supplied with the sulfuric acid and the water, a continuous dissolution can be achieved without increasing a retention time and without unnecessarily enlarging the equipment.

Accordingly, a throughput per equipment can be increased, and a thermal shock in a case of batch processing can be reduced to extend the product lifetime of the equipment.

According to the eighth invention, since the first dissolution step is controlled based on the result of the second dissolution step, the nickel solution of the predetermined concentration can be stably obtained.

DESCRIPTION OF EMBODIMENTS

Figure 1:
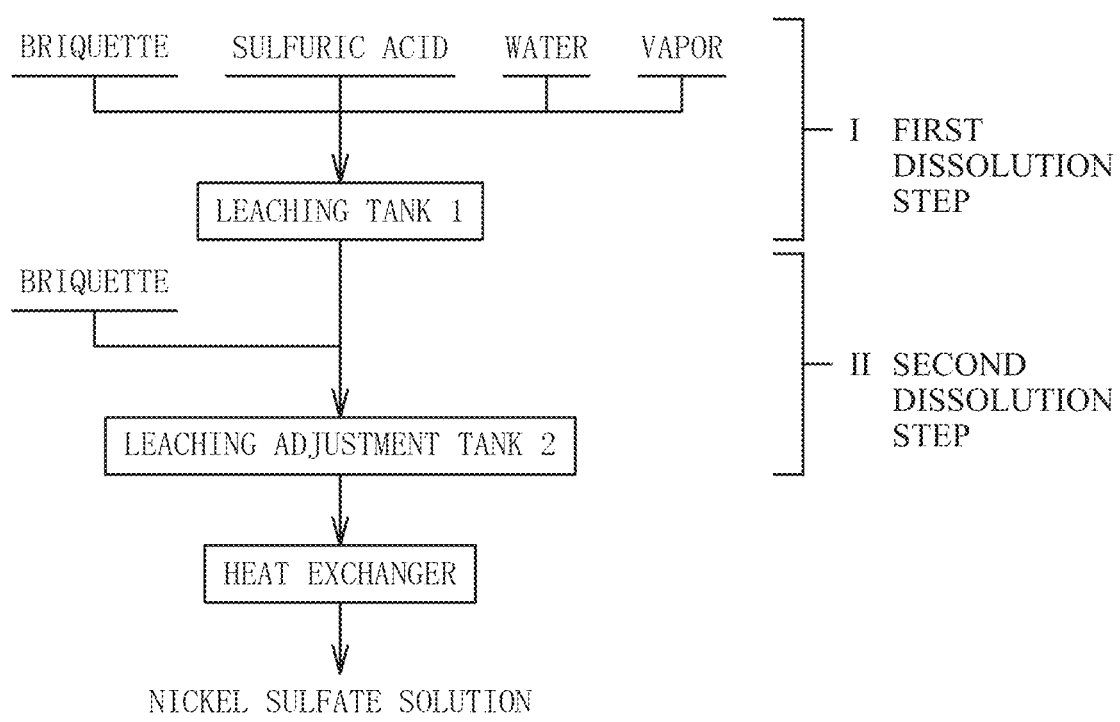
FIG. 1 is a process drawing illustrating a production method for a nickel sulfate solution according to the present invention.

The embodiment of the present invention will be described in the following order by referring to the drawings. The present invention is not limited to the following embodiment, and various changes can be made within a range without departing from the gist of the present invention.

(Production Method)

The production method for a nickel sulfate solution of the present invention will be described based on FIG. 1.

The production method of the present invention includes a first dissolution step I and a second dissolution step II, and these processes I and II are continuously operated.

The first dissolution step I is a process in which a nickel briquette, sulfuric acid, and water are introduced to a leaching tank 1, and the nickel briquette is dissolved, thereby obtaining a primary nickel sulfate solution. The second dissolution step II is a process in which the primary nickel sulfate solution is introduced to a leaching adjustment tank 2, a nickel briquette is additionally introduced, and the additionally introduced nickel briquette is dissolved with free sulfuric acid in the primary nickel sulfate solution, thereby obtaining a nickel sulfate solution.

In the production method of the present invention, a dissolution tank for the first dissolution step I and a dissolution tank for the second dissolution step II are coupled in series in two stages to be used. Then, a free sulfuric acid concentration is set to be high in the leaching tank 1 as the first tank to dissolve a lot of nickel briquettes, and a small amount of nickel briquettes are dissolved with only the free sulfuric acid, which was an excess in the leaching tank 1, in the leaching adjustment tank 2 as the second tank to obtain a nickel solution of a target concentration.

That is, the leaching adjustment tank 2 has a role as a concentration adjustment tank that increases the nickel concentration and decreases the free sulfuric acid concentration. Therefore, by supplying sulfuric acid and water only to the leaching tank 1, nickel can be continuously dissolved without increasing the retention time and without unnecessarily enlarging the equipment.

The free sulfuric acid in this description means excess sulfuric acid not involved in the leaching reaction. The free sulfuric acid is also referred to as unreacted and/or residual sulfuric acid.

(Production Apparatus)

Figure 2:
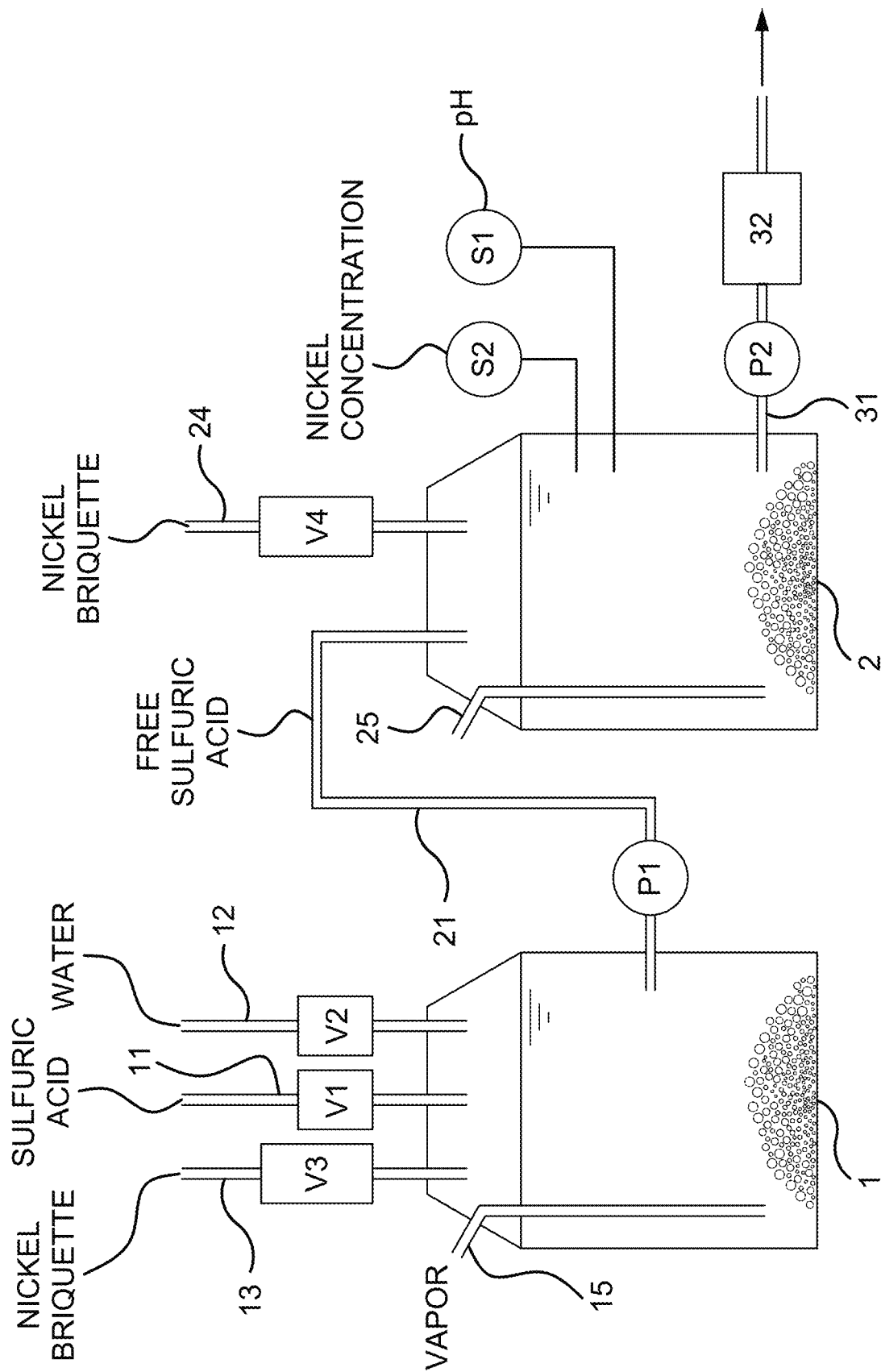
FIG. 2 is an explanatory view of a production apparatus according to one embodiment of the present invention.

The production apparatus for the nickel sulfate solution according to the present invention has a configuration in which two dissolution tanks of the leaching tank 1 and the leaching adjustment tank 2 are coupled in series as illustrated in FIG. 2.

The leaching tank 1 is a dissolution tank in which the nickel briquette, sulfuric acid, and water are introduced to dissolve the nickel briquette, thus obtaining the primary nickel sulfate solution. Then, a pipe 13 for introducing the nickel briquette and a metering valve V3 interposed thereto, a pipe 11 for introducing the sulfuric acid and a valve V1 interposed thereto, and a pipe 12 for introducing the water and a valve V2 interposed thereto are included. A vapor inlet pipe 15 for warming a liquid inside the leaching tank 1 is included.

The leaching adjustment tank 2 is a dissolution tank in which the primary nickel sulfate solution in the leaching tank 1 and the additional nickel briquette are introduced to dissolve the nickel briquette with the free sulfuric acid in the primary nickel sulfate solution, thus obtaining the nickel sulfate solution. A liquid transfer pipe 21 for introducing the nickel sulfate solution that contains a large amount of free sulfuric acid in the leaching tank 1 to the leaching adjustment tank 2 is coupled between the leaching adjustment tank 2 and the leaching tank 1, and a pump P1 is interposed to the liquid transfer pipe 21. The leaching adjustment tank 2 includes a pipe 24 for introducing the additional nickel briquette and a metering valve V4 interposed thereto, and a vapor inlet pipe 25 for warming a liquid inside the leaching adjustment tank 2.

The leaching adjustment tank 2 includes a liquid transfer pipe 31 for taking the obtained nickel sulfate solution out of the system, and a pump P2 interposed thereto. A heat exchanger 32 is interposed to the liquid transfer pipe 31. The heat exchanger 32 is used to cause a liquid temperature of the leaching adjustment tank 2 so as not to exceed a set value (for example, 80° C. described later).

Next, the function and the role of each unit in the equipment will be described in detail with reference to FIG. 2.

(Leaching Tank 1)

The nickel briquette is dissolved with the sulfuric acid by continuously supplying the nickel briquette, the sulfuric acid, and the water in the leaching tank 1 at first. In the tank, metallic nickel is dissolved while generating hydrogen by the following reaction equation.

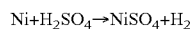
(Formula 1)

Since the amount of the sulfuric acid to be supplied includes an amount necessary for the leaching adjustment tank 2 as the second tank continuous with the leaching tank 1 as the first tank, the amount larger than a mole ratio between nickel and sulfuric acid described in the formula 1 is supplied. In the leaching tank 1, this is a cause to maintain the high concentration of the free sulfuric acid, thus allowing maintaining the large dissolution rate.

Since an effect of the temperature is large for the dissolution rate, vapor is supplied from the pipe 15 to adjust a temperature in the tank to 60° C. to 90° C., preferably 80° C. Specifically, it is only necessary that an on/off switch for vapor supply is set to a measurement temperature in the tank so as to be, for example, turned on at 78° C. and turned off at 80° C.

The leaching tank 1 aims to dissolve a large amount of nickel in short period. Therefore, it is preferable to increase the amount of sulfuric acid supplied to the leaching tank 1. The increased amount of sulfuric acid increases the amount of free sulfuric acid in the leaching tank 1, thus allowing the promoted dissolution of the nickel briquette.

Here, the sulfuric acid concentration of the primary nickel sulfate solution in the leaching tank 1 is preferably set to 60 to 80 g/L. The sulfuric acid concentration of 60 g/L or less decreases the dissolution rate of the nickel briquette. The sulfuric acid concentration of 80 g/L or more makes processing of the free sulfuric acid difficult in the next leaching adjustment tank 2. The sulfuric acid concentration within the range of 60 to 80 g/L allows dissolving the large amount of nickel in short period in the leaching tank 1 without difficulty in the processing of the free sulfuric acid in the leaching adjustment tank 2.

The nickel concentration of the primary nickel sulfate solution in the leaching tank 1 is preferably set to 40 to 110 g/L. The nickel concentration of 40 g/L or less cannot increase the concentration of the finally obtained nickel solution, and it is inefficient. In the case of 110 g/L or more, the concentration of the finally obtained nickel solution becomes excessively high, and the nickel sulfate partially recrystallizes to cause a pipe obstruction in a later process in some cases. The nickel concentration in the range of 40 to 110 g/L allows obtaining the nickel solution of the target concentration, and avoiding a drawback that the nickel sulfate partially recrystallizes to cause a pipe obstruction in a later process. The range of the nickel concentration is more preferably 60 to 100 g/L, and the above-described effect is more easily obtained in this case.

(Leaching Adjustment Tank 2)

In the leaching adjustment tank 2, the further additional nickel briquette is supplied through the pipe 24 to the primary nickel sulfate solution that is supplied from the leaching tank 1 and contains free sulfuric acid, thereby increasing the nickel concentration and decreasing the free sulfuric acid concentration. Since the dissolution rate is minimized when the free sulfuric acid is zero, a free sulfuric acid concentration that can ensure a certain dissolution rate is required.

The free sulfuric acid concentration is preferably 50 g/L or less. 5 g/L is especially preferred. Since the higher the free sulfuric acid concentration is, the higher the dissolution rate is, the retention amount of the nickel briquette in the second tank remains small. Meanwhile, since the lower the free sulfuric acid concentration is, the lower the dissolution rate is, the nickel briquette retention is increased, and it is also necessary to increase the free sulfuric acid concentration.

For obtaining proper free sulfuric acid concentration and nickel briquette retention amount in the tank, a pH value as a process parameter is preferably set to a range of 0.5 to 3. While there is an individual difference in the dissolution rate of the nickel briquette depending on the supplier, approximately pH 1 is typically assumed as a proper set value.

The nickel concentration in the leaching adjustment tank 2 is converted from the measurement value of a solution density (or specific gravity) in the tank. While the free sulfuric acid concentration also affects the solution density (or specific gravity) in the tank, the nickel concentration has a larger influence, and has no problem in the use as the converted value.

The solubility of the nickel sulfate itself is not so high and has a temperature dependency. Then, since crystals are deposited in the solution and causes a trouble such as a pipe obstruction when the concentration becomes the solubility or more, the target nickel concentration is set to 80 to 160 g/L, preferably 100 to 120 g/L. The corresponding density is 1.2 to 1.4 g/cc, and this is set as the process parameter to adjust the water amount supplied to the leaching tank 1. Note that since the density is the same as the specific gravity while units are different, the specific gravity may be used as the process parameter.

Since the water is not supplied to the leaching adjustment tank 2 as the second tank, a heat of reaction in the briquette dissolution directly leads to the temperature rise of the solution. In practice, heats of vaporization of water vapor accompanying the generated hydrogen gas and water vapor accompanying the large flow rate of air flowing in the space in the tank for diluting hydrogen concentration contribute to decreasing the temperature, thus avoiding the large temperature rise. However, from the aspect of equipment protection, the heat exchanger 32 is disposed not to allow the liquid temperature of the leaching adjustment tank 2 to exceed the set value (for example, 80° C.).

(Process Control)

In the above-described two-step nickel dissolution method, for the stable operation, the parameters for process operation are preferably automatically controlled.

The parameters for process operation are nickel briquette supply amounts to the leaching tank 1 and the leaching adjustment tank 2, a sulfuric acid supply amount (only leaching tank 1), and a water supply amount (only leaching tank 1), and a high nickel concentration, a low free sulfuric acid concentration, and a predetermined throughput of the obtained nickel sulfate solution are targeted.

Figure 3:
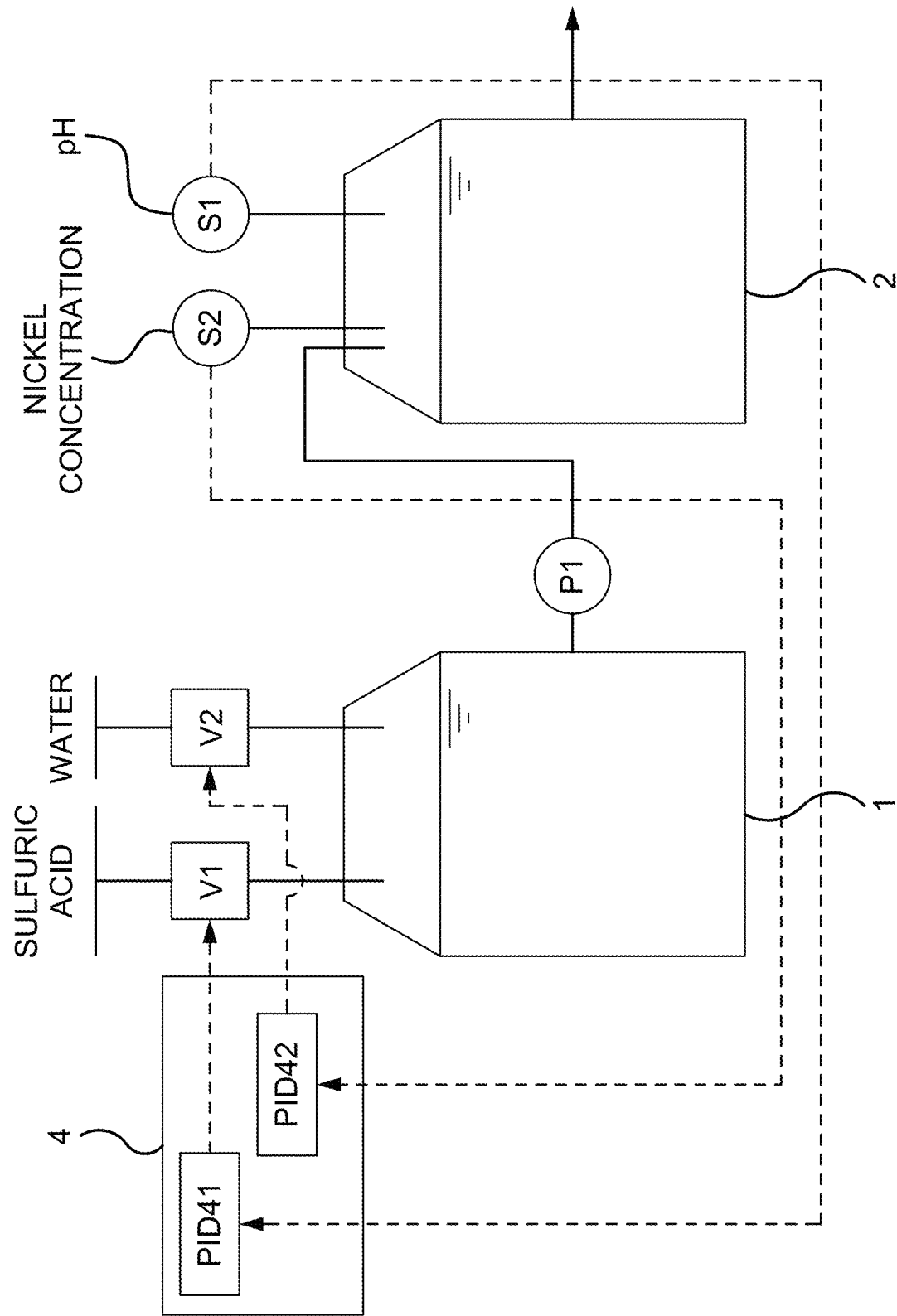
FIG. 3 is an explanatory view of a process control system applied to the production apparatus illustrated in FIG. 2.

As illustrated in FIG. 3, the leaching adjustment tank 2 includes a sensor S1 for pH measurement of a dissolution liquid and a sensor S2 for nickel concentration measurement. Any sensor may be used for the sensor S1 insofar as the pH of the dissolution liquid can be measured. For example, a pH sensor of electrode immersion type may be used, or an appropriate pH sensor may be used for the measurement while a sampling is performed with a solution circulation system formed. Any sensor may be used for the sensor S2 insofar as the nickel concentration can be measured. For example, one for measuring the density or specific gravity of the nickel sulfate solution, or one using an absorptiometry may be used.

Control means in the present invention includes a valve V1 for supplying sulfuric acid and a valve V2 for supplying water, which are disposed to the leaching tank 1, the sensors S1, S2, and a control unit 4.

A PID controller 41 in the control unit 4 controls an opening and closing amount of the valve V1, which adjusts the sulfuric acid supply amount, based on the pH value measured by the sensor S1. A PID controller 42 in the control unit 4 controls an opening and closing amount of the valve V2, which adjusts the water supply amount, based on the nickel concentration measured by the sensor S2.

Next, a control method by the control device illustrated in FIG. 3 will be described.

Since the nickel briquette retention amounts in the tanks of the leaching tank 1 and the leaching adjustment tank 2 are expected to be constant during the stable operation of the production apparatus illustrated in FIG. 2, the nickel briquette supply amount meeting the throughput is set as a fixed value. Obviously, while the supply amounts are differentiated between the leaching tank 1 having the large dissolution rate and the leaching adjustment tank 2 having the small dissolution rate, the ratio is based on allowing the equalized nickel briquette retention amounts in the respective tanks 1, 2. Specifically, 37 to 47 kg/h/m$^3$ in the leaching tank 1 and 18 to 28 kg/h/m$^3$ in the leaching adjustment tank 2 are preferred.

While the continuous dissolution of the present invention is to be referred to as a sulfuric acid concentration two-step continuous dissolution method, in this method, for stably obtaining the nickel solution of the predetermined concentration, the nickel concentration and the pH of the nickel solution in the leaching adjustment tank 2 are measured to control the sulfuric acid and the water supplied to the leaching tank 1.

Since the process variation during the operation is inevitable, accordingly, it is necessary to adjust the supply amounts of the sulfuric acid and the water. In this case, from the degree of influence on the process value, the sulfuric acid supply amount is adjusted by the free sulfuric acid concentration indicated by the pH value (which is measured by the sensor S1) of the leaching adjustment tank 2, and the water supply amount is adjusted by the nickel concentration (which is measured by the sensor S2) in the leaching adjustment tank 2. While the supply amounts of the sulfuric acid and the water vary depending on the free sulfuric acid concentration and the nickel concentration in the leaching adjustment tank 2 as described above, absolute amounts of them are determined depending on the tank volume.

As described above, for the free sulfuric acid concentration and the nickel concentration, the process value of the leaching adjustment tank 2 is measured, and a supply flow rate to the leaching tank 1 is adjusted based on this. While this control is performed by the control device 4 illustrated in FIG. 3, there is a time lag before the control of the leaching tank 1 is reflected on the measurement result in the leaching adjustment tank 2.

When an ordinary PID control is applied to the control system illustrated in FIG. 3, since a time lag occurs in the control, a simple PID control causes hunting, thus failing to perform the stable operation. Therefore, in the present invention, it is preferred that upper and lower limit values of the supply amounts of the sulfuric acid and the water supplied to the leaching tank 1 are preliminarily set, thereby setting a control range to reduce the hunting. Specifically, the upper and lower limits are set, plus and minus, from a supply required amount calculated from the target concentration, thus having an adjusted flow rate by the PID control within a constant range. Accordingly, the nickel concentration and the free sulfuric acid concentration can be kept in a slight variation, thus allowing making the concentration of the nickel sulfate solution of a finally stored product approximately constant. Specifically, +20% of a value in a flowsheet considering an average mass balance is set to the upper limit, and −20% is set to the lower limit. Accordingly, the hunting is reduced, thus allowing having the concentration variation of the obtained solution within an allowable range.

(Advantage of Present Invention)

The production method for nickel sulfate solution disclosed in Patent Document 1 as the prior art is a batch type, the equipment is large-sized compared with the throughput while it is simple, and the equipment deteriorates quickly due to the thermal shock. In contrast, the sulfuric acid concentration two-step continuous dissolution method of the present invention is achievable with small-sized equipment with the same throughput, and the product lifetime of the equipment can be extended because there is no thermal shock.

The reduction in size of the equipment can facilitate the maintenance, thereby allowing reducing the operation cost.

The production method using the production apparatus of the present invention also provides an advantage of high degree of freedom in the operation.

For example, the nickel concentration and the free sulfuric acid concentration are adjustable, and the concentration control corresponding to the process variation can be performed. There is an advantage of facilitated operation provided by a flexibility in which, for example, the free sulfuric acid concentration can be set corresponding to the throughput and the individual difference of the briquette while looking at the operation result.

EXAMPLES

While the following describes the present invention in further detail by the examples, the present invention is not limited to these examples.

Example 1

An experiment was performed by a small-sized simulation that simulates the equipment of FIG. 3.

A nickel briquette supply rate to the leaching tank 1 was 42 kg/h/m$^3$, and a nickel briquette supply rate to the leaching adjustment tank 2 was 23 kg/h/m$^3$. The nickel briquette retention in each of the tanks 1, 2 was simulated by preliminarily introducing the nickel briquette by appropriate amounts.

The supply amount of the sulfuric acid to the leaching tank 1 was adjusted based on the pH in the leaching adjustment tank 2, and the supply amount of the water was adjusted based on the nickel concentration in the leaching adjustment tank 2.

Figure 4A:
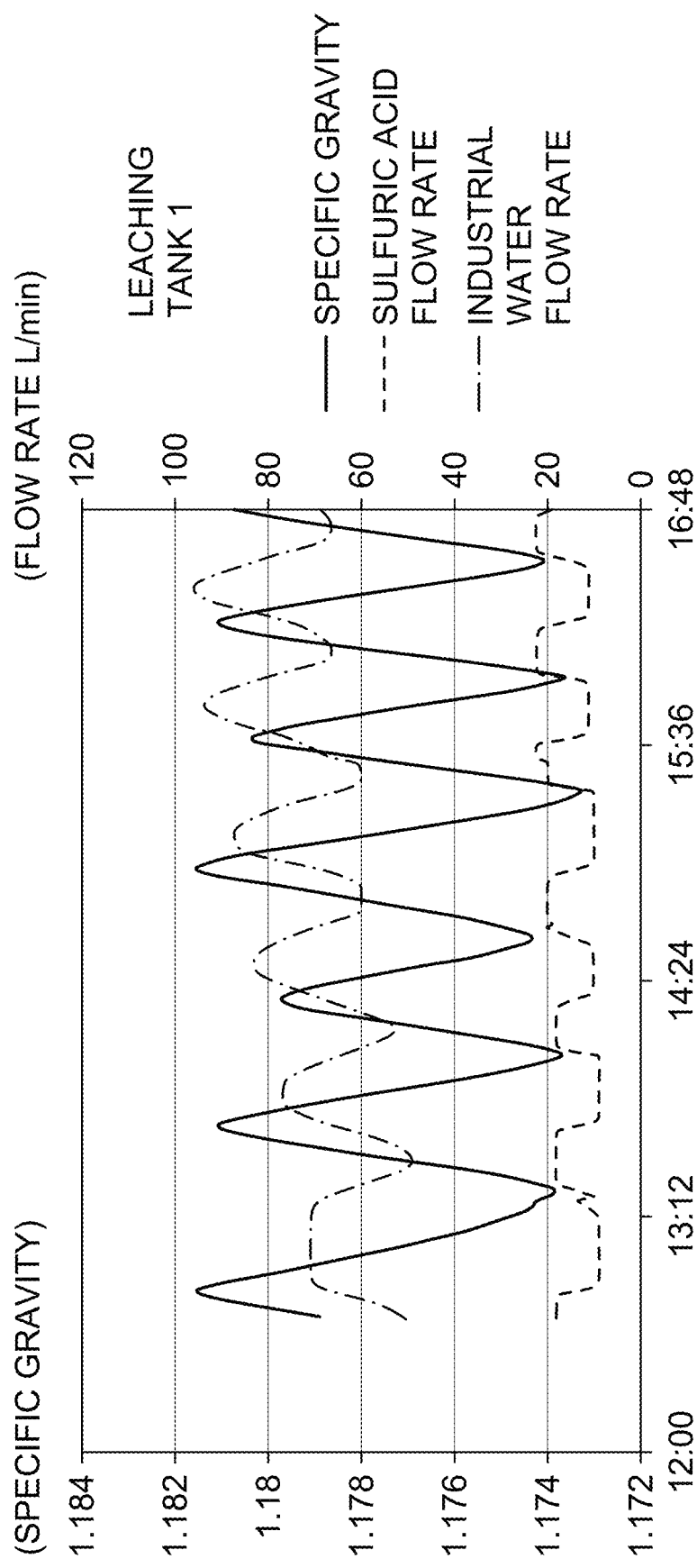
FIG. 4A is a graphs illustrating a result of a leaching tank 1 in execution of the process control of FIG. 3.
Figure 4B:
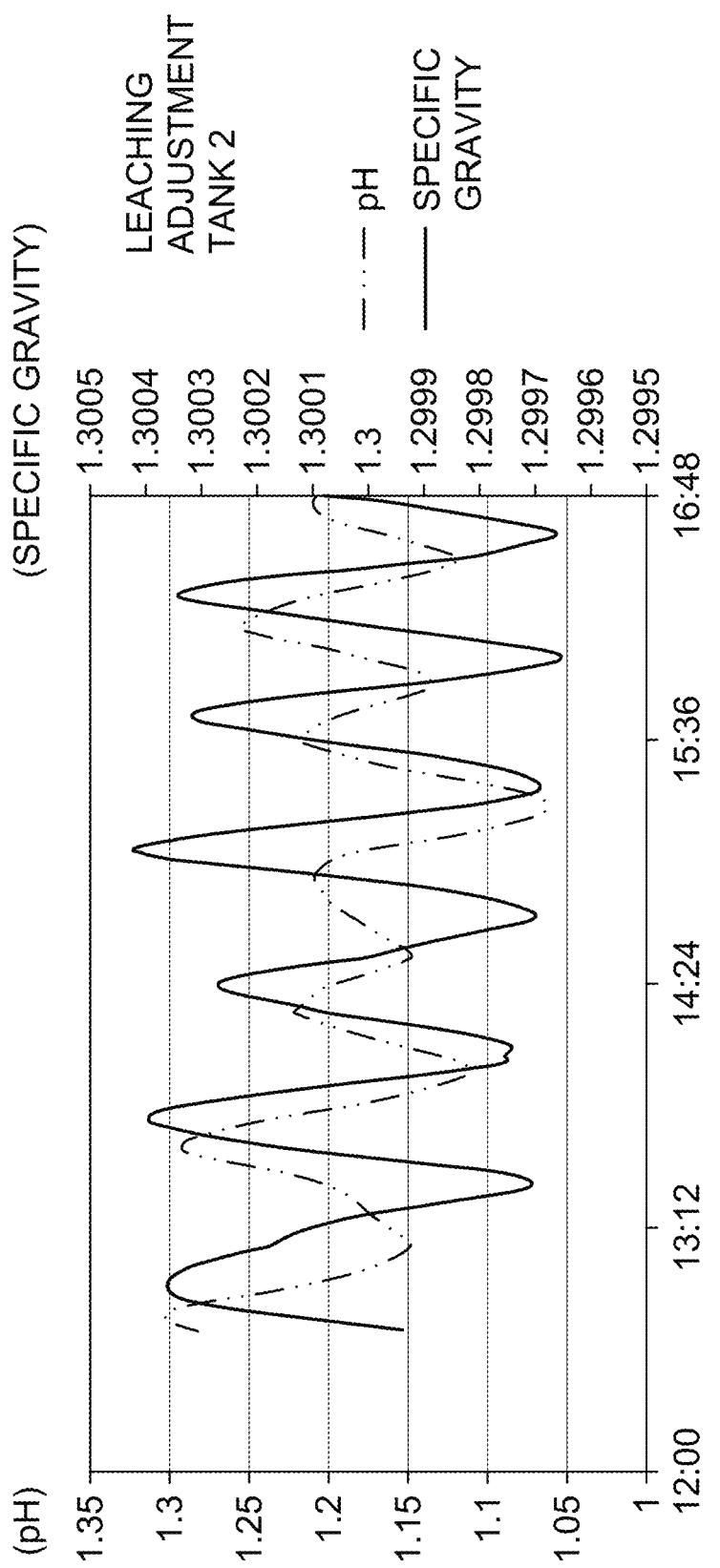
FIG. 4B is a graphs illustrating a result of a leaching tank 2 in execution of the process control of FIG. 3.

FIG. 4A illustrates process data of the leaching tank 1, and FIG. 4B illustrates process data of the leaching adjustment tank 2.

The sulfuric acid flow rate and an industrial water flow rate in the leaching tank 1 were adjusted based on the respective measured values of the specific gravity and the pH in the leaching adjustment tank 2 illustrated in FIG. 4B.

While both the control parameters (specific gravity and pH) and the control results (sulfuric acid flow rate and industrial water flow rate) draw waveforms because this control has a first-order lag, it is indicated that the control is appropriately performed because each of the waveforms is regular.

Since the specific gravities indicating the solution densities in the tanks of the leaching tank 1 and the leaching adjustment tank 2 also remain in regular waveforms, it is considered that the appropriate nickel concentrations are kept in both tanks 1, 2. The slight increases toward the right side of the sulfuric acid flow rate and the industrial water flow rate in FIG. 4A are caused by gradually increasing the throughput, and they remain at the same level in the ordinary operation.

The effects of the production method and the equipment of the present invention will be further described. Since the dissolution rate of nickel depends on likelihood of association between nickel and free sulfuric acid and their contact period, increasing the sulfuric acid concentration or enlarging the tank to increase the retention time allows increasing the throughput (nickel dissolution amount). However, the free sulfuric acid concentration of the leaching adjustment tank 2 has the upper limit, and the nickel concentration increase remains at approximately 60 g/L. Accordingly, use of the large-sized equipment that increases the retention time is an only way for obtaining the further increased dissolution amount. Therefore, if the continuous dissolution by sulfuric acid with one sulfuric acid concentration and one dissolution tank were attempted, there would be no choice but the considerably large-sized facility.

In contrast, in the two-tank continuous dissolution method of the present invention, since the sulfuric acid concentration is increased in the first tank, the sulfuric acid continuous dissolution can be performed without enlarging each tank. Since the first dissolution step is controlled based on the result of the second dissolution step, the nickel solution of the predetermined concentration can be stably obtained, thus allowing obtaining a reasonable raw material in the process of producing the lithium nickel composite oxide in the later process.

INDUSTRIAL APPLICABILITY

The execution of the present invention provides the nickel sulfate solution of the predetermined concentration, and the obtained nickel sulfate solution is applicable to any use.

When producing lithium nickelate to be used for a battery material and the like, it is preferred that the concentration of nickel is high and the concentration of free sulfuric acid is low in the nickel sulfate solution from the aspect of ensuring the throughput, and the present invention is suitable for such a use.

Then, according to the present invention, the required throughput can be ensured without unnecessarily enlarging the equipment.

REFERENCE SIGNS LIST 1 leaching tank
2 leaching adjustment tank
4 control unit
11 pipe
12 pipe
13 pipe
21 liquid transfer pipe
V1 valve
V2 valve V3 metering valve
S1 sensor
S2 sensor
P1 pump

The invention claimed is:

1. A production method for a nickel sulfate solution, comprising:
a first dissolution step of introducing a nickel briquette, water, and sulfuric acid in an amount greater than that required to dissolve said nickel briquette to a leaching tank and dissolving the nickel briquette to obtain a primary nickel sulfate solution containing excess free sulfuric acid that was not involved in the leaching reaction,
a second dissolution step of introducing the primary nickel sulfate solution and additionally introducing a nickel briquette to a leaching adjustment tank and dissolving the additionally introduced nickel briquette with only free sulfuric acid in the primary nickel sulfate solution to obtain a nickel sulfate solution; to increase the nickel concentration, and to lower the free sulfuric acid concentration to obtain a nickel sulfate solution of a target concentration, the second dissolution step being performed after the first dissolution step,
measuring a nickel concentration and a pH of the nickel sulfate solution in the second dissolution step, and controlling supply amounts of the sulfuric acid and the water in the first dissolution step based on the measured nickel concentration and the pH.

2. The production method for the nickel sulfate solution according to claim 1, wherein
by controlling supply amounts of the sulfuric acid and the water in the first dissolution step,
a concentration of the sulfuric acid in the primary nickel sulfate solution in the leaching tank is set to 60 to 80 g/L,
and a nickel concentration of the primary nickel sulfate solution in the leaching tank is set to 40 to 110 g/L.

3. The production method for the nickel sulfate solution according to claim 2, wherein
a supply rate of the nickel briquette to the leaching tank in the first dissolution step is set to 37 to 47 kg/h/m$^3$, and a supply rate of the nickel briquette to the leaching adjustment tank in the second dissolution step is set to 18 to 28 kg/h/m$^3$.

4. The production method for the nickel sulfate solution according to claim 2, wherein
a pH value (converted under 25° C.) of the nickel sulfate solution in the leaching adjustment tank is set to 0.5 to 3.

5. The production method for the nickel sulfate solution according to claim 2, wherein
the nickel concentration of the nickel sulfate solution in the leaching adjustment tank at the second dissolution step is set to 80 to 160 g/L.

* * * * *